United States Patent
Cairns et al.

(10) Patent No.: US 9,163,498 B2
(45) Date of Patent: Oct. 20, 2015

(54) APPARATUS AND METHODS FOR DETERMINING PARAMETERS DOWNHOLE USING GRAVITY-AFFECTED SENSOR

(75) Inventors: Paul G. Cairns, Houston, TX (US); Kurt J. Kuck, Magnolia, TX (US); Robert A. Estes, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 904 days.

(21) Appl. No.: 13/326,025

(22) Filed: Dec. 14, 2011

(65) Prior Publication Data

US 2013/0153206 A1 Jun. 20, 2013

(51) Int. Cl.
*E21B 47/02* (2006.01)
*G01C 9/10* (2006.01)
*E21B 47/022* (2012.01)
*H01H 35/02* (2006.01)

(52) U.S. Cl.
CPC ............ *E21B 47/02232* (2013.01); *G01C 9/10* (2013.01); *G01C 2009/107* (2013.01); *H01H 35/02* (2013.01)

(58) Field of Classification Search
CPC ......... H01H 11/02; H01H 35/02; G01C 9/10; G01C 2009/102; G01C 2009/105; G01C 2009/107
USPC .......................................................... 175/45
See application file for complete search history.

(56) References Cited

U.S. PATENT DOCUMENTS

| | | | |
|---|---|---|---|
| 3,164,023 A | 1/1965 | Holderer | |
| 3,786,472 A | 1/1974 | Scopacasa | |
| 3,791,042 A * | 2/1974 | Bell | 340/853.8 |
| 3,805,398 A | 4/1974 | Russell et al. | |
| 4,587,741 A | 5/1986 | Rorden et al. | |
| 4,672,753 A | 6/1987 | Kent et al. | |
| 4,688,025 A * | 8/1987 | Frank | 340/571 |
| 5,017,932 A | 5/1991 | Ushiyama et al. | |
| 5,209,343 A | 5/1993 | Romano et al. | |
| 5,430,435 A * | 7/1995 | Hoch et al. | 340/573.7 |
| 5,479,716 A | 1/1996 | Murphy | |
| 5,519,668 A * | 5/1996 | Montaron | 367/35 |
| 5,607,361 A * | 3/1997 | Mastandrea et al. | 473/207 |
| 6,281,456 B1 * | 8/2001 | Ogden | 200/61.46 |
| 6,351,892 B1 | 3/2002 | Mercer et al. | |
| 6,516,527 B1 | 2/2003 | Moriyasu | |
| 6,769,499 B2 | 8/2004 | Cargill et al. | |
| 2003/0034178 A1 | 2/2003 | Cargill et al. | |
| 2003/0056381 A1 | 3/2003 | Brosnahan et al. | |
| 2004/0028476 A1 * | 2/2004 | Payne et al. | 405/184 |
| 2005/0257616 A1 | 11/2005 | Kozlov et al. | |
| 2007/0253173 A1 * | 11/2007 | Dart | 361/736 |

(Continued)

OTHER PUBLICATIONS

International Search Report and Written Opinion dated Mar. 27, 2013 for International Application No. PCT/US2012/069199; all references in PCT are cited above.

*Primary Examiner* — Giovanna C Wright

(74) *Attorney, Agent, or Firm* — Cantor Colburn LLP

(57) ABSTRACT

In one aspect, an apparatus for use in a wellbore is provided that in one embodiment includes a sensor having a plurality of spaced conductive contact elements, a sensing member that moves by gravity and contacts at least two contact elements in the plurality of contact elements to create an electrical short between such at least two contact elements and a circuit coupled to the contact elements configured to generate electrical signals in response to the electrical short between the contact elements.

19 Claims, 7 Drawing Sheets

(56) References Cited

U.S. PATENT DOCUMENTS

| | | |
|---|---|---|
| 2008/0035376 A1 | 2/2008 | Freyer |
| 2008/0294343 A1 | 11/2008 | Sugiura |
| 2009/0205867 A1 | 8/2009 | Reckmann et al. |
| 2009/0222209 A1 | 9/2009 | Morys |

* cited by examiner

APPARATUS AND METHODS FOR DETERMINING PARAMETERS DOWNHOLE USING GRAVITY-AFFECTED SENSOR

BACKGROUND

1. Field of the Disclosure

This disclosure relates generally to apparatus and methods for the gravity toolface of a tool downhole and/or other parameters relating thereto, including inclination, orientation and temperature.

2. Background of the Art

Oil wells (also referred to as wellbores or boreholes) are drilled with a drill string that includes a tubular member (also referred to as a "drilling tubular") having a drilling assembly (also referred to as "bottomhole assembly" or "BHA") which includes a drill bit attached to the bottom end thereof. The drill bit is rotated to disintegrate the rock formation to drill the wellbore. The BHA includes devices and sensors for providing information about a variety of parameters relating to the drilling operations (referred to as "drilling parameters"), the behavior of the BHA (referred to as "BHA parameters") and the formation surrounding the wellbore being drilled (referred to as "formation parameters"). A substantial number of currently drilled wellbores are deviated wellbore and horizontal wellbores. The BHA used for drilling such wellbores usually includes one or more devices configured to steer the BHA so as to drill such wellbores along selected well paths. Such devices include magnetometers to provide measurements of the toolface, which measurements are taken when the BHA is rotating and are also unaffected by the BHA vibration. The magnetometer measurements are typically referenced to the gravity toolface measurements taken by other sensors, such as accelerometers, when the when the BHA is stationary.

The disclosure herein, in one aspect, provides apparatus and methods for determining gravity toolface that may be utilized as a reference for the gravity toolface measurement, which apparatus also may be utilized to determine other measurements, such as inclination, orientation and temperature of the BHA.

SUMMARY OF THE DISCLOSURE

In one aspect, an apparatus for use in a wellbore is provided that in one embodiment includes a sensor having a plurality of spaced conductive contact elements, a sensing member that moves by gravity and contacts at least two contact elements in the plurality of contact elements to create an electrical short between such at least two contact elements and a circuit coupled to the contact elements configured to generate electrical signals in response to the electrical short between the contact elements.

In another aspect, a method of determining a parameter downhole is provided that in one embodiment includes: deploying a tool in the wellbore, which tool includes a sensor having a plurality of spaced conductive contact elements, a sensing member that moves by gravity and contacts at least two contact elements in the plurality of contact elements to create an electrical short between such at least two contact elements and a circuit coupled to the contact elements configured to generate electrical signals in response to the electrical short between the contact elements; processing the electrical signals to determine a downhole parameter. In aspects, the downhole parameter may be one or more selected from a group consisting of: toolface, inclination and orientation of the tool. In another aspect, the downhole parameter may be temperature.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

The disclosure herein is best understood with reference to the accompanying figures in which like numerals have generally been assigned to like elements and in which.

DESCRIPTION OF THE EMBODIMENTS

Figure 1:
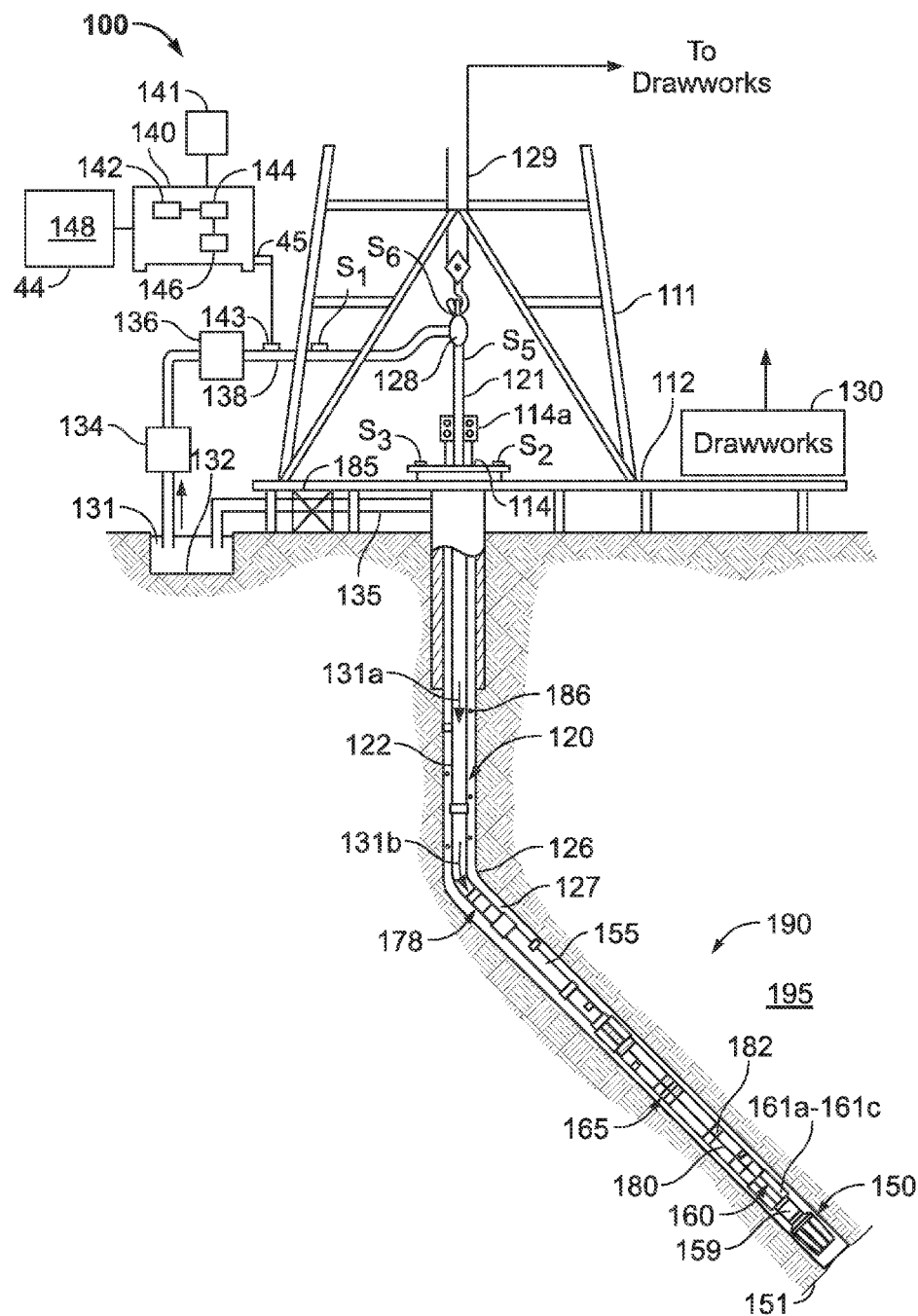
FIG. 1 is an elevation view of a drilling system that includes a device for determining gravity toolface, inclination, orientation and temperature of a tool downhole.

FIG. 1 is a schematic diagram of an exemplary drilling system 100 that includes a drill string 120 having a drilling assembly attached to its bottom end. Drill string 120 includes a drilling assembly or bottomhole assembly ("BHA") 190 conveyed in a borehole 126. The drilling system 100 includes a conventional derrick 111 erected on a platform or floor 112 that supports a rotary table 114 that is rotated by a prime mover, such as an electric motor (not shown), at a desired rotational speed. A tubing (such as jointed drill pipe) 122, having the drilling assembly 190 attached at its bottom end, extends from the surface to the bottom 151 of the borehole 126. A drill bit 150, attached to drilling assembly 190, disintegrates the geological formations when it is rotated to drill the borehole 126. The drill string 120 is coupled to a draw works 130 via a Kelly joint 121, swivel 128 and line 129 through a pulley. Draw works 130 is operated to control the weight on bit ("WOB"). The drill string 120 may be rotated by a top drive 114a rather than the prime mover and the rotary table 114.

In an aspect, a suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. Surface torque sensor $S_2$ and a sensor $S_3$ associated with the drill string 120 provide information about the torque and the rotational speed of the drill string 120. Rate of penetration of the drill string 120 may be determined from sensor $S_5$, while the sensor $S_6$ may provide the hook load of the drill string 120. In some applications, the drill bit 150 is rotated by rotating the drill pipe 122. However, in other applications, a downhole motor 155 (mud motor) disposed in the drilling assembly 190 may rotate the drill bit 150 alone or in addition to the drill string rotation.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided by a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole devices and may control one or more operations of the The drilling assembly 190 may also contain formation evaluation sensors or devices (also referred to as measurement-while-drilling, "MWD," or logging-while-drilling, "LWD," sensors) for determining resistivity, density, porosity, permeability, acoustic properties, nuclear-magnetic resonance properties, corrosive properties of the fluids or the formation, salt or saline content, and other selected properties of the formation 195 surrounding the drilling assembly 190. Such sensors are generally known in the art and for convenience are collectively denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

Still referring to FIG. 1, the drill string 120 further includes a power generation device 178 for providing electrical energy to various devices and sensors in the BHA, including devices 165 and 159. In one configuration, the drilling assembly 190 further includes a steering device 160 that includes steering members (also referred to a force application members) 160a, 160b, 160c that may be configured to independently apply force on the borehole 126 to steer the drill bit 150 along any particular direction. The drilling assembly 190 further contains a device 180 for determining the gravity-affected toolface, which device also may be utilized to determine one or more additional parameters, such as inclination, orientation and temperature of the BHA as described in more detail in reference to FIGS. 2-8. The parameters determined utilizing the device 180 may be utilized to perform one or more operations, including steering the BHA along a particular direction.

Figure 2:
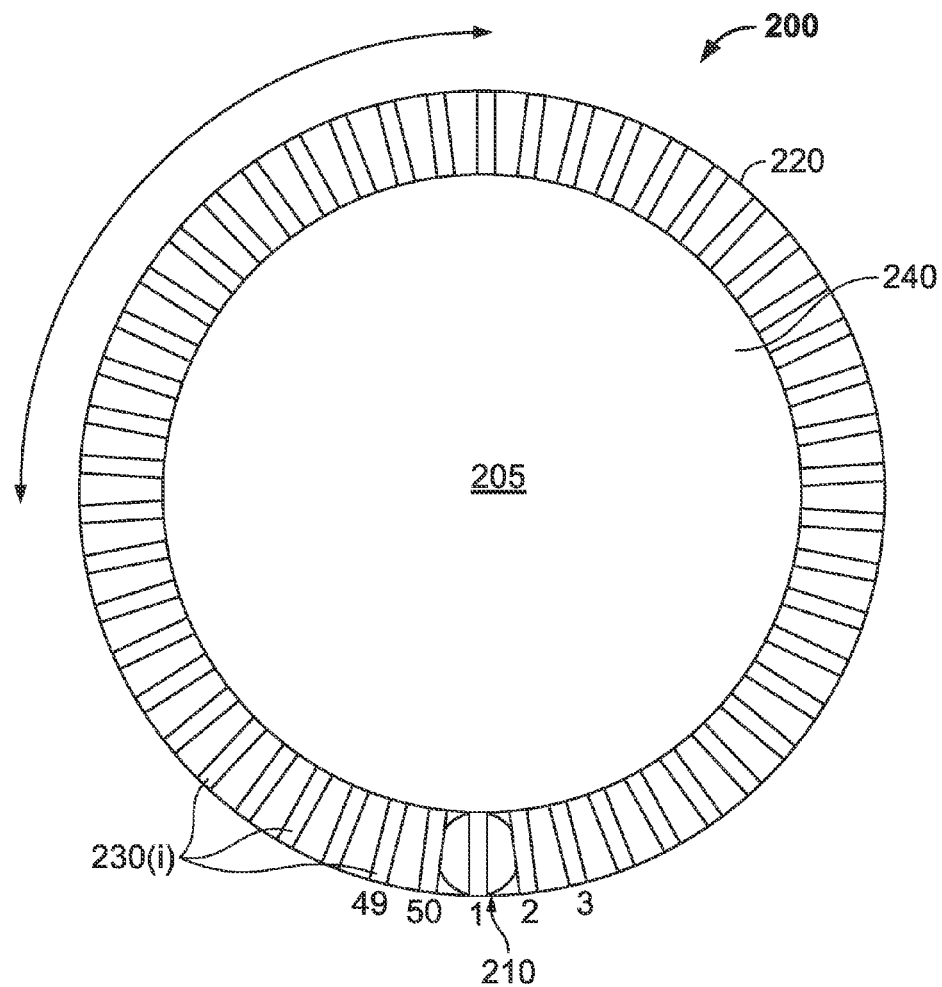
FIG. 2 shows an active member of a gravity-affected directionally sensitive sensor for determining toolface of a tool in the wellbore, according to one embodiment of the disclosure.

FIG. 2 shows an active member 200 of a gravity-affected (or gravity-based) directionally sensitive sensor, made according to one embodiment of the disclosure. The active member 200 includes a disc or plate 205 made from a non-conductive material 240 that has a number of spaced-apart contact elements (also referred to herein as fingers) 230(i) arranged along a track 220 on the disc 205. A conductive or partially conductive contact member (also referred to as the "sensing member") 210 is configured to freely or substantially freely travel over the contacts 230(i) around the track 220. In the particular configuration of FIG. 2, the track 220 is circular and includes 50 equally-spaced contact elements (numbered 1-50) arranged around the circumference of a circle on the disc 205. The disc 205 may be made of any suitable nonconductive material 240, including, but not limited to, printed circuit boards, ceramic materials and semiconductor materials, such as used in making hybrid circuits. The contact elements may be formed in any suitable shape and may be etched in, embedded in or placed on the base plate 205 in any suitable manner. The contact elements 230(i) may be made from any suitable material, such as gold, silver, aluminum, copper, etc. In aspects, the contact elements 230(i) may be evenly or unevenly spaced along the track 220. The particular arrangement of 50 evenly-spaced contact elements 230(i) shown in FIG. 2 provides an accuracy of 360/50 degrees for the gravity toolface determined using such an arrangement. A greater number of contact elements 230(i) will provide greater accuracy while a lesser number of contact elements will provide lower accuracy. Any suitable number of contact elements, however, may be utilized.

Still referring to FIG. 2, the contact member 210 acts as a sensing member and may be made from any suitable conductive material, including, but not limited to, mercury, gold, silver, copper and aluminum. In a particular configuration, the sensing member 210 may be a mercury member in the form of a ball, an oval shape or another suitable shape and size. It is known that the wellbore temperature increases with the vertical depth of the wellbore and thus a mercury contact member will expand or contract as the temperature of the wellbore increases or decreases. In one aspect, the change in the dimension of the mercury member can also provide a measurement for the downhole temperature because such changes cause the mercury member 210 to cover differing areas of the fingers 230(i). The number of fingers that are covered can be used to provide a measure of the temperature. The midpoint of the covered fingers can be used to obtain an accurate reading point of the gravity toolface indicator. In addition, the use of a mercury sensing element also may increase the reliability of the contact elements 230(i) because the friction of mercury is lower that the friction of metals. Also, a mercury mass (a sphere or an oval mass) can make can make more consistent contact between the fingers 230(i).

Figure 3B:
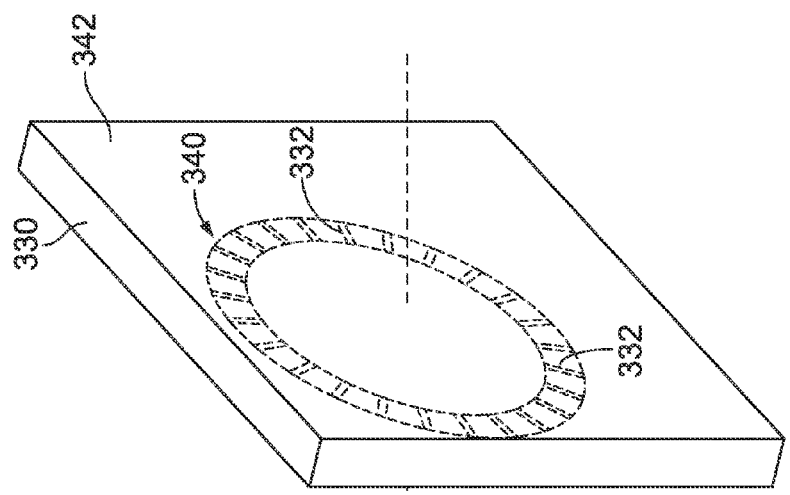
FIGS. 3A-3C show a pair of active members shown in FIG. 2 and a spacer member that may be assembled together to form a gravity-affected directionally sensitive sensor for determining toolface and certain other parameters of a tool downhole.
Figure 3C:
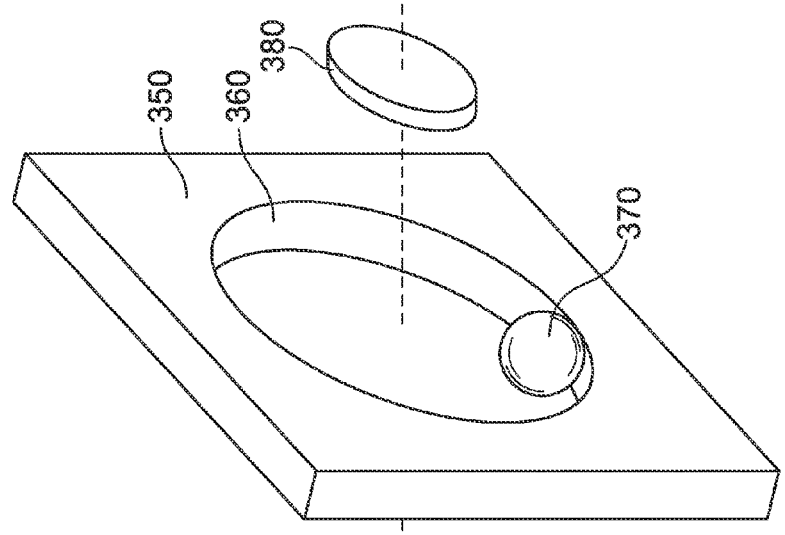
Figure 3A:
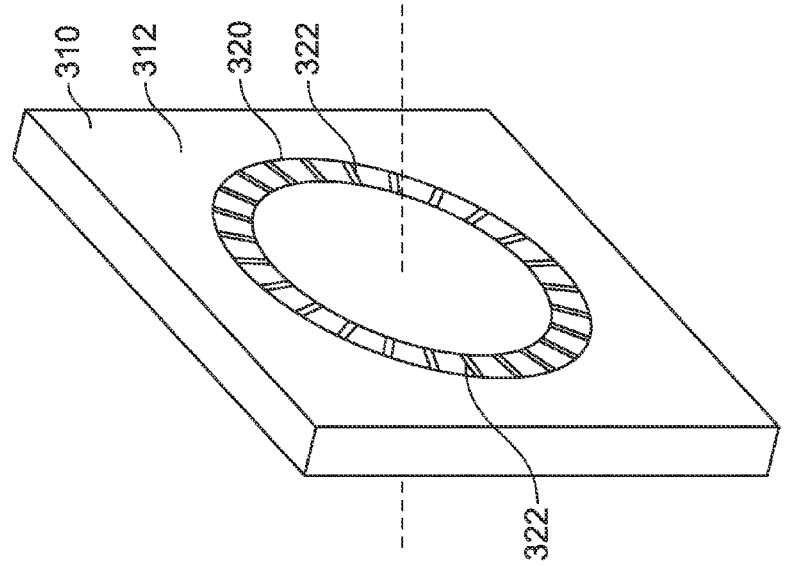

FIGS. 3A-3C show a method of assembling a gravity-affected sensor that utilizes a pair of active members, such as members 200 shown in FIG. 2. FIG. 3A shows a first active member 310 made from a non-conductive material 312 that includes equally-spaced conductive contact elements or fingers 322 arranged along a circular track 320. The fingers 322 may be embedded in the nonconductive material 312 or may be formed on top of the surface of the active member 310. FIG. 3B shows a second active member 330 made from a nonconductive material 342 that includes equally-spaced conductive contact elements or fingers 332 arranged along a circular track 340. The fingers 332 may be embedded in the nonconductive plate 342 or raised from its surface. In the particular configuration shown, the number and dimensions of fingers 322 and 332 are the same and when the active members 310 and 330 face each other, the fingers 322 and 332 face each other. FIG. 3C shows a nonconductive spacer 350 configured to be placed between the active members 310 and 330. The nonconductive spacer 350 includes a circular opening 360 configured to allow a contact member 370, such as a ball or an oval member, to move freely along a circle formed in front of the tracks 320 and 340, thereby contacting the contact elements on both the active members as the contact member 370 moves along the circular path 360. To form a sensor, the members 310, 350 and 330 are coupled together or attached to each other so that the spacer member 350 along with the contact member 370 are between the active members 310 and 330. Another embodiment of the sensor may utilize a single active element, such as member 310, a spacer, such as spacer 350, and a contact or sensing member, such as ball 370, enclosed by a blank disc or member 380, wherein the contact member 370 freely moves over the fingers of the active member to short at least two fingers at any given location.

Figure 4:
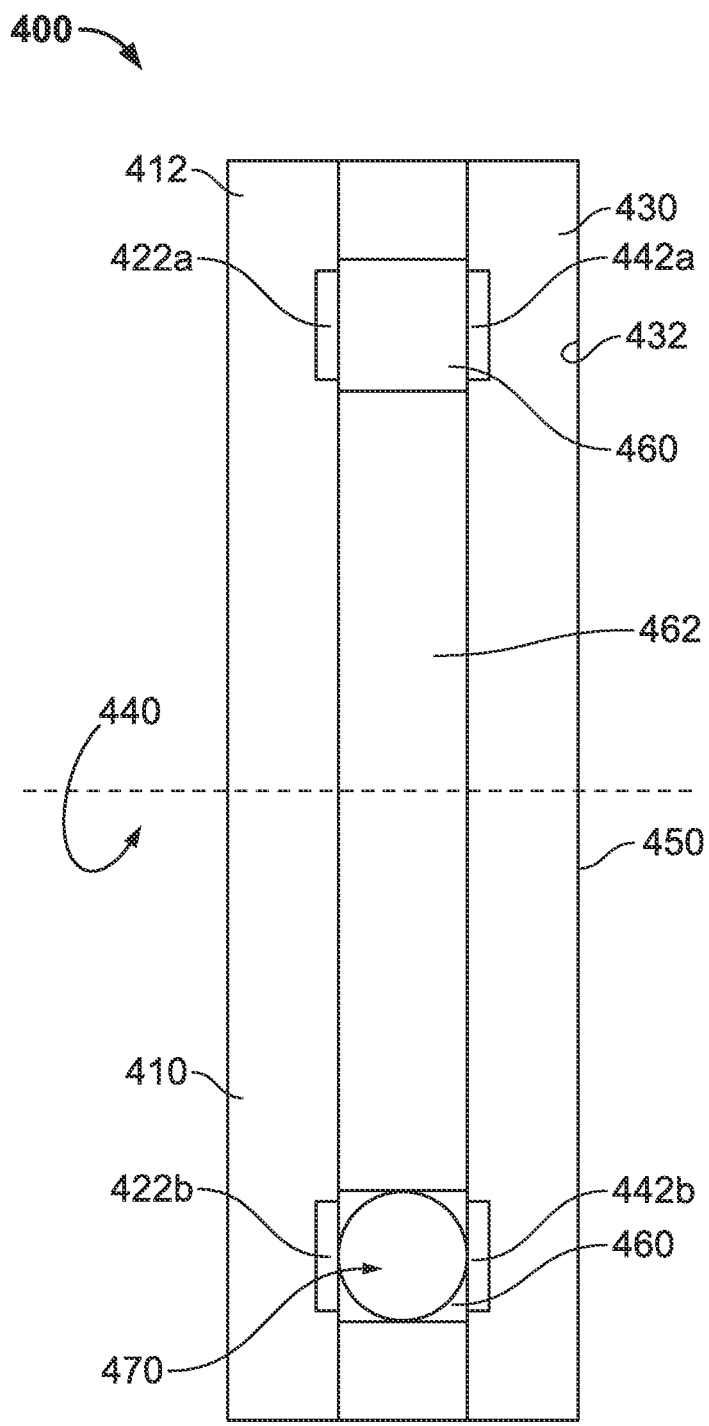
FIG. 4 shows a cross-section of a sensor made by using the components shown in FIGS. 3A-3C.

FIG. 4 shows a cross-section of a sensor 400 made using the components shown in FIGS. 3A-3C. The sensor 400 includes a first disc or plate 410 made from a nonconductive material 412 that has placed therein conductive contact elements or fingers 422a and 422b. The contact elements 422a and 422b are shown embedded in the plate 410. The remaining contact elements around a circular track on member 412 are not visible. The sensor 400 includes a second disc or plate 430 made from a nonconductive material 432 that includes conductive contact elements along a circular track, including contact elements 442a and 442b. The contact element 422a faces contact 442a and contact element 422b faces contact element 442b. A nonconductive spacer 450 placed between the discs 410 and 430 includes a circular space 460 across from the contact elements 422a, 422b, 442a, 442b, etc. on plates 410 and 430. A conductive contact member 470, such as a ball, is placed in the circular space 460 of the spacer 462 so that it can freely move by gravity inside the spaced 460 and come in contact with the contact elements 422a, 422b, 442a, 442b, etc. In use, the contact member 470 being gravity affected, remains at the lowermost location of the circular space 460, as shown in FIG. 4. In operation, the sensor 400 rotates about the axis 440. In other aspects, the circular spacer 462 has similar temperature expansion rate as the conductive contact member 470. Expansion of the spacer equals the diameter of the conductive contact member 470 so that it maintains electrical contact with the contact fingers.

Referring to FIGS. 3 and 4, in various embodiments, the contact elements 322 and 332 may be made of metallic fingers as described hereinabove, or may utilize any other suitable device, including, but not limited to, hall-effect sensors, coils to measure inductance or members that provide signals corresponding to resistance, capacitance or a change in a magnetic field. The sensing elements may be conductive, partially conductive, resistive, partially resistive, capacitive, inductive, magnetic, or any type that produces a difference in the readings of the contact elements or fingers and is directionally sensitive to effect of gravity.

Figure 5:
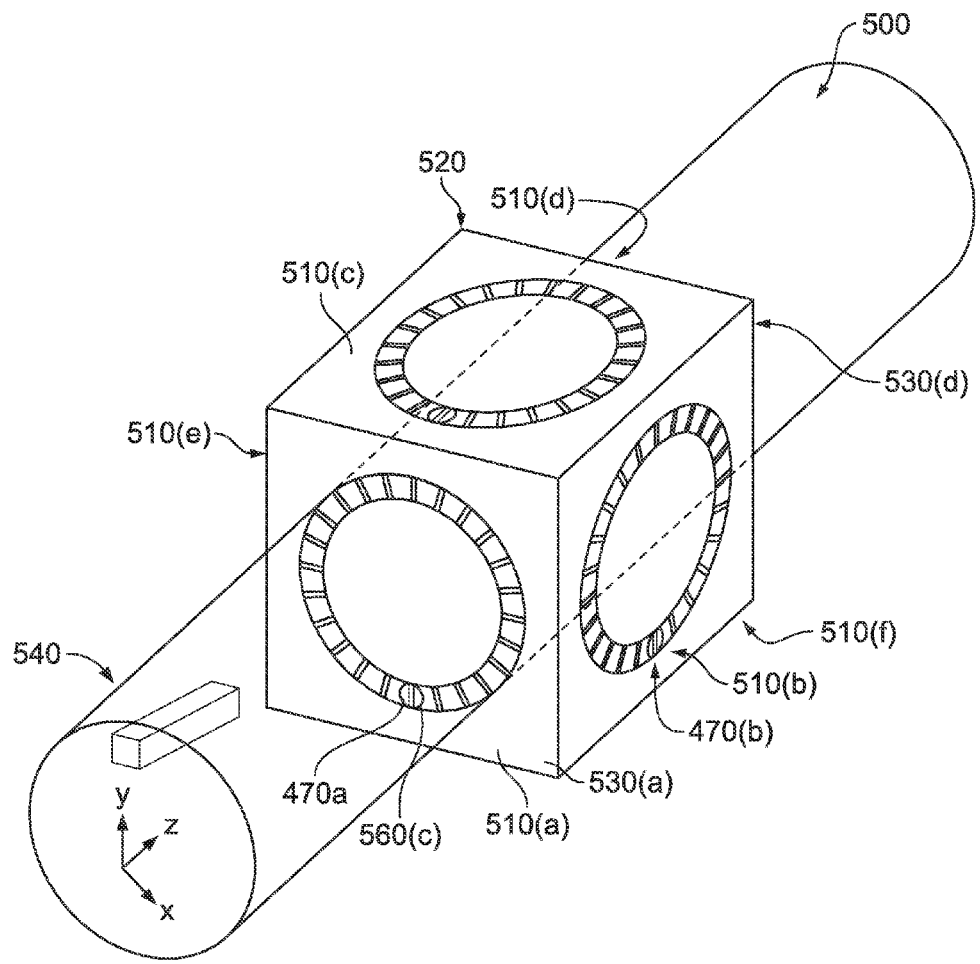
FIG. 5 shows placement of a number of sensors, such as shown in FIG. 4, in a tubular member associated with a bottomhole assembly.

FIG. 5 shows placement of a number of sensors, such as shown in FIGS. 4-5, in a downhole tool 500 that may be an independent tool or associated with or part of a bottomhole assembly, such as bottomhole assembly 190 shown in FIG. 1. In the particular configuration of tool 500, six sensors 510a, 510b, 510c, 510d, 510e and 510f are shown placed on surfaces of a cube 520, wherein sensors 510a and 510d, placed on the opposing sides 530a and 530d of the cube, form a first pair, sensors 510b and 510e form a second sensor pair and sensors 510c and 510f form a third pair. The tool 500 has a z-axis along the longitudinal axis of the tool 500, an x-axis along a horizontal direction perpendicular to the longitudinal z-axis and a y-axis along a vertical direction to the longitudinal z-axis. In the configuration shown in FIG. 5, the sensor pair 510a and 510d cover the x-y plane, providing gravity toolface measurements of the tool 500 in the horizontal position to the vertical position. In operation, when the tool 500 is in a horizontal position, the ball 470a will contact the fingers at position zero degree. When the tool 500 rotates, the ball 470a will contact the fingers that equal to the turn of the tool 500 relative to the high side 540. Since the location of the fingers is known relative to the high side 540, sensor 510a will provide signals corresponding to such contact elements. A controller, such as controller 170 and/or 140 (FIG. 1), determines the toolface from the sensor signals. Sensor 510d will also provide a signal that should be the same as provided by sensor 510a. The signal from sensor 510d may be used to correlate the results provided by sensor 510a or vice versa.

Still referring to FIG. 5, sensor 510b covers the y-z plane of the tool 500 and the signals provided by this sensor may be utilized to determine inclination of the tool 500 between the horizontal and vertical positions. When the tool 500 inclines from a horizontal position, the ball 470b will contact fingers of the sensor 510b that turn as the tool inclines and the signals provided will correspond to the inclination of the tool 500. Sensor 510e signals may be used to correlate the inclination determined from sensor 510b or vice versa. Sensor 510c covers the x-z plane of the tool 500. When the tool 500 turns along the z-axis, the ball 470c will turn corresponding to the turn of the tool, thereby providing signals corresponding to the orientation of the tool 500. Sensor 510(f) signals may be utilized to correlate the orientation determined from sensor 510(c) or vice versa. In the sensor arrangement shown in FIG. 5, each of the toolface, inclination and orientation measurements may be made independent of each other, as different sensors are utilized for each such measurement. Temperature may be deduced from any one or more of these sensors by measuring the area covered by the contact member, such as a ball. In other aspects, any of the sensors may be produced in silicon with a large number of fingers, which may be of nanometers in width. As noted, earlier, the number of fingers directly corresponds to the accuracy and resolution of the sensor. One or more of these sensors may then be incorporated in many planes to provide values of inclination as well as gravity toolface. As previously mentioned, the expansion of the sensing element covering more fingers can be used to calculate temperature. Multiples of such sensors together with a measuring circuitry and a processing unit may be incorporated into a single integrated circuit or silicon chip. This permits forming a very small and relatively accurate sensor.

Figure 6:
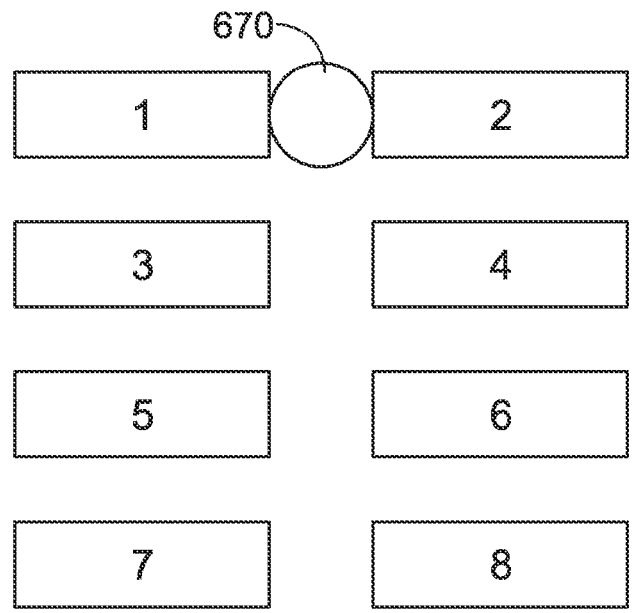
FIG. 6 shows a side-by-side placement of contact elements of two opposing active element members of a sensor made according to one embodiment of the disclosure.
Figure 7:
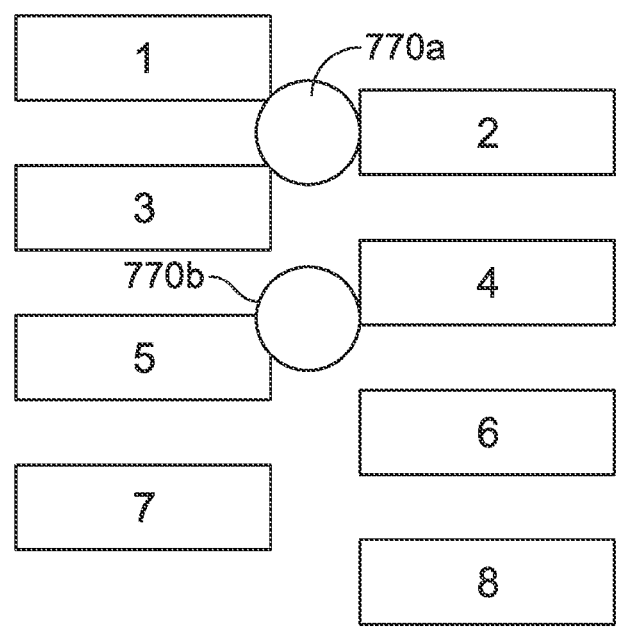
FIG. 7 shows an interlaced placement of contact elements of two opposing active element members of the sensor made according to an alternative embodiment of the disclosure.

As noted earlier, in the particular configuration of sensors in FIG. 5, each of the sensors 510a though 510f include two tracks of fingers opposing each other, wherein the opposing fingers are of the same size and face each other. Such a configuration is shown in FIG. 6, wherein fingers numbered 1, 3, 5, etc., are on one disc while the fingers numbered 2, 4, 6, etc. are on the opposing disc. In such a case, the contact member, such as ball 670, will contact two contact fingers at any given time, for example fingers 1-2 or 3-4 or 5-6, etc. However, other contact arrangements may also be utilized for the purpose of this disclosure. FIG. 7 shows an interlaced-fingers configuration. In one configuration, a ball, such as ball 770a may be provided that will contact two or more fingers at any given time, such as fingers 1, 2 and 3. In another configuration, the ball 770b may be provided that will contact two fingers, such as shown fingers 4 and 5. Utilizing interlaced fingers can effectively double the resolution as the angle between contact points is halved. Also, a larger volume of mercury may be utilized to short more number of fingers.

In aspects, the contact element connectivity, i.e., to which contact elements the ball is connected at any given time, may be determined by suitable processor, such as the downhole processor 172 and/or the surface processor 142, which may be a general purpose microprocessor, a digital signal processor (DSP), FPGA or another suitable computing device. One method of determining such contact information is described in reference to FIG. 8.

Figure 8:
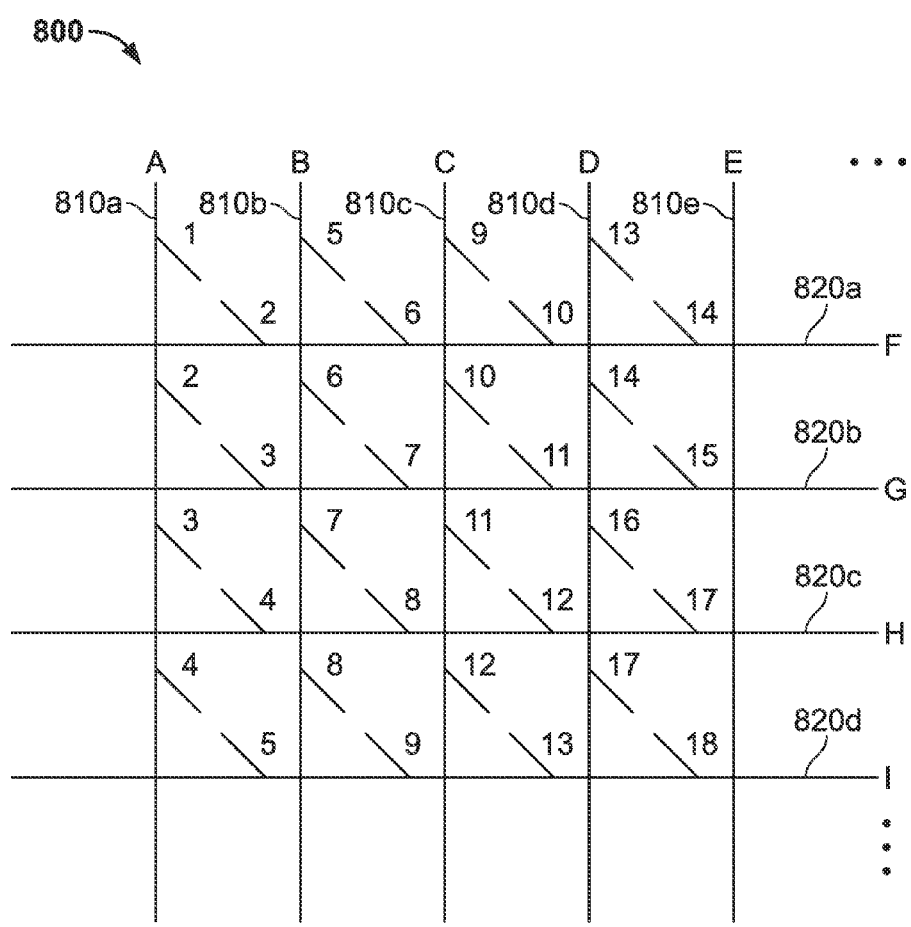
FIG. 8 shows an exemplary matrix switch arrangement that may be utilized to determine the contact elements covered by a contact for determining the toolface and other parameters.

FIG. 8 shows an exemplary matrix switch arrangement 800 that may be utilized to compute which fingers are connected to (or shorted by) the conductive contact member at any given time, such as the balls 670, 770a and 770b shown in FIGS. 6 and 7. The matrix switch 800 shows vertical lines 810a, 810b, etc., intersecting with horizontal lines 820a, 820b, etc. In aspects, lines 810a, 810b, etc. may be designated as output excitation connections and lines 820a, 820a, 820b, etc. as input excitation connections or vice versa. A suitable electrical circuit is provided that at any one time, applies an electrical voltage to one of the vertical lines 810a, 810b, etc., and reads the voltages at all the horizontal lines 820a, 820b, etc., and determines which contact fingers are connected by the contact member, such as member 670. This process is repeated for each of the lines. Referring to FIG. 6, when the ball 670 connects contact fingers 1 and 2, the circuit is completed between lines 810a and 820a because the ball 670 has shorted conductive contact fingers 1 and 2. In such a case, a voltage V1 applied to line 810a will appear on line 820a while all other lines, such as lines 820b, 820c etc. will be at zero potential. Similarly, when the ball 670 is in contact with contact fingers 6 and 7, a voltage V1 applied to line 810b will appear at point 820b while all other lines 820a, 820c, etc. will be at zero potential. In operation, voltage V1 may be applied in sequence to the lines 810a, 810b, etc. while looking at lines 820a, 820b, etc. for an output voltage to determine the contact elements connected by the ball. Referring to FIG. 7, when the ball 770a is in contact with conductive elements 1, 2 and 3, a voltage applied to line 810a will produce a voltage at line 820a and 820b and none at any other line. Knowing the location of the applied voltage and the location or locations of the received voltage, the location of the ball can be determined, which is correlated to the toolface, inclination and orientation of the tool, such as tool 500 (FIG. 5) or bottomhole assembly 190 (FIG. 1). In the above-noted method, essentially a signature is sent out on one set of lines, which is read on the connected second set of lines. In this manner, a large number of inputs can be read with a reduced set of input/output lines on a computational unit. With such a method, the processor can calculate which input fingers are reading the generated output signal. Since the ball can electrically connect to more than one finger, the processing unit can measure the response on multiple fingers. Using this method, the processor can determine the location of the ball in the track that is producing the measurement of gravity toolface angle.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. An apparatus for use in a wellbore, comprising:
a sensor having:
a first circular track of circumferentially-spaced contact elements and a second circular track of circumferentially-spaced contact elements axially separated from the first circular track, wherein the first circular track and second circular track form a plurality of pairs of opposed contact elements;
a sensing member that moves by gravity in a circular path between the first circular track and the second circular track and contacts at least two adjacent pairs of opposed contact elements to create at least two electrical shorts involving the at least two adjacent pairs of opposed contact elements; and
a circuit coupled to the opposed contact elements configured to generate electrical signals in response to the at least two electrical shorts involving the at least two adjacent pairs of opposed contact elements.

2. The apparatus of claim 1, wherein a pair of contact elements includes a contact element from the first circular track and a contact element from the second circular track.

3. The apparatus of claim 2, wherein the contact elements in a selected pair face each other.

4. The apparatus of claim 2, wherein the contact elements in a selected pair are interlaced and the sensing member contacts the contact elements of the selected pair and at least one other contact element.

5. The apparatus of claim 1, wherein the circuit is configured to detect a plurality of shorted contact elements.

6. The apparatus of claim 1, wherein the sensing member comprises mercury in the form selected from a group consisting of: (i) sphere; (ii) oval; and (iii) another shape configured to contact two or more contact elements.

7. The apparatus of claim 1, wherein the sensing member and the contact elements exhibit substantially same coefficient of expansion.

8. The apparatus of claim 7 further comprising a circuit coupled to the contact elements provides signals responsive to the expansion of the sensing element and a processor configured to determine temperature from such signals.

9. The apparatus of claim 1 further comprising a processor configured to determine from the electrical signals a parameter of the tool selected from a group consisting of: (i) tool face: (ii) inclination; and (iii) orientation.

10. An apparatus for determining a parameter of interest downhole, comprising:
a tool body; and
a sensor in the tool body that contains:
a first circular track of circumferentially-spaced contact elements and a second circular track of contact elements axially separated from the first circular track, wherein the first circular track and second circular track form a plurality of pairs of opposed contact elements; and
a sensing member that moves by gravity in a circular path between the first circular track and the second circular track and contacts at least two adjacent pairs of opposed contact elements to create at least two electrical shorts involving the at least two adjacent pairs of opposed contact elements;
a circuit coupled to the contact elements configured to generate electrical signals in response to the at least two electrical shorts between the at least two adjacent pairs of opposed contact elements; and
a processor configured to process the signals to determine the parameter of interest.

11. The apparatus of claim 10, wherein the parameter of interest is selected from a group consisting of: (i) toolface; (ii) inclination; (iii) orientation; and (iv) temperature.

12. The apparatus of claim 10, wherein a pair of contact elements includes a contact element from the first circular track and a contact element from the second circular track.

13. The apparatus of claim 12, wherein the contact elements in a selected pair are interlaced and the sensing member contacts the contact elements of the selected pair and at least one other contact element.

14. The apparatus of claim 10, wherein the circuit is configured to detect a plurality of shorted contact elements.

15. The apparatus of claim 10, wherein the sensing member comprises mercury in the form selected from a group consisting of: (i) sphere; (ii) oval; and (iii) another shape configured to contact two or more contact elements.

16. The apparatus of claim 10, wherein the sensing member and the contact elements exhibit substantially same coefficient of expansion.

17. The apparatus of claim 16 further comprising a circuit coupled to the contact elements that provides signals responsive to the expansion of the sensing element and a processor configured to determine temperature from such signals.

18. An apparatus for determining a parameter of interest downhole, comprising:
a tool body configured to be deployed in a wellbore;
a gravity-assisted sensor in the tool that includes:
a first circular track of circumferentially-spaced contact elements and a second circular track of circumferentially-spaced contact elements axially separated from the first circular track, wherein the first circular track and the second circular track form a plurality of pairs of opposed contact elements,
a sensing member that freely moves along a circular path between the first circular track and the second circular track to cause shorts between at least two adjacent pairs of opposed contact elements at a time and generate electrical signals corresponding to such shorts; and
a processor configured to determine the parameter of interest utilizing the electrical signals.

19. The apparatus of claim 18, wherein the parameter of interest is a gravity toolface and wherein the apparatus further includes a sensor for determining a magnetic toolface of the tool and wherein the gravity toolface is utilized as a reference to the magnetic tool face during operation of the tool in the wellbore.

* * * * *